June 17, 1952 — I. R. ADAMS — 2,600,459
CIRCULAR SAW WITH ADJUSTABLE ARBOR-RECEIVING OPENINGS
Filed Dec. 23, 1949
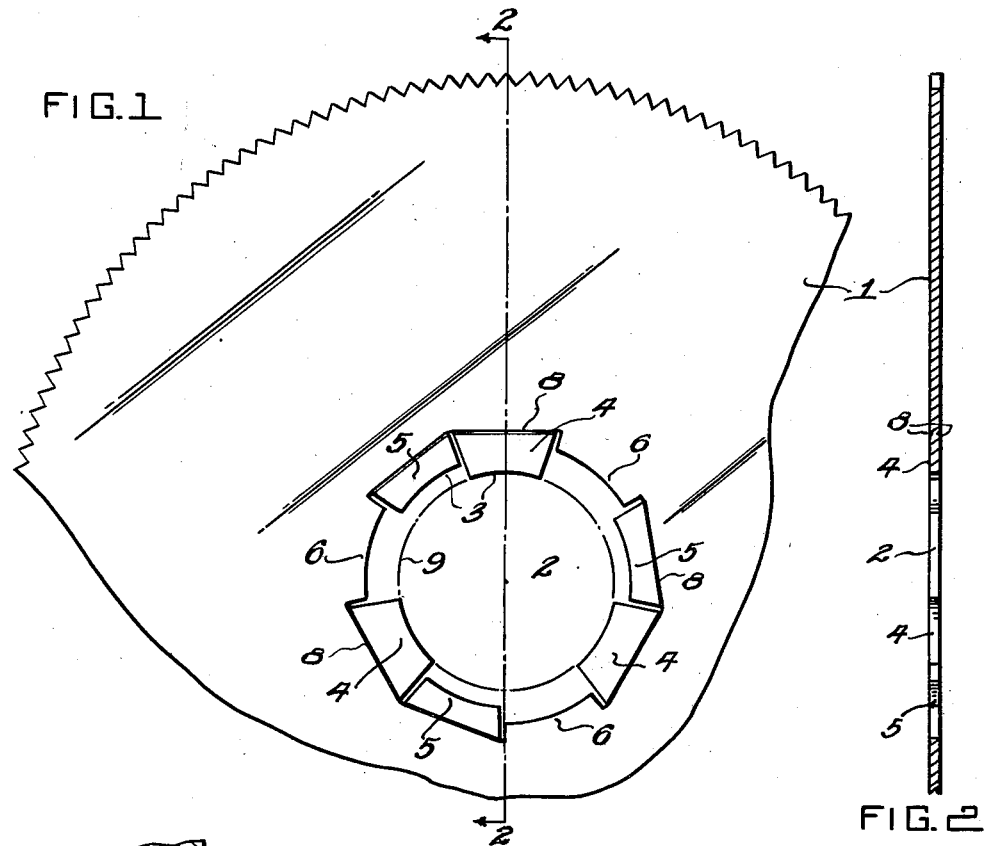
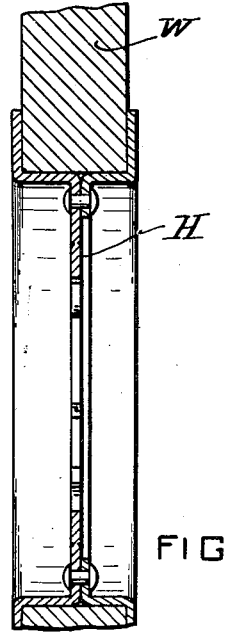
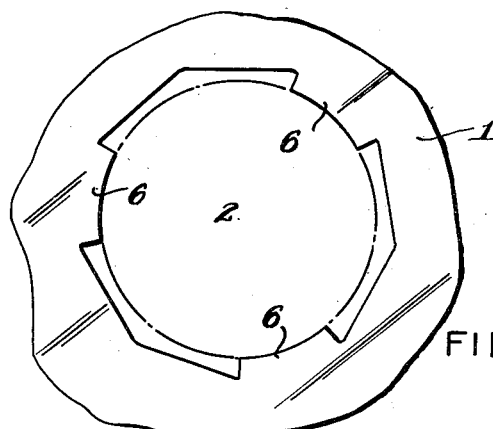
INVENTOR.
Ivan R. Adams
BY
W. S. McDowell
ATTORNEY Patented June 17, 1952

2,600,459

UNITED STATES PATENT OFFICE 2,600,459

CIRCULAR SAW WITH ADJUSTABLE ARBOR-RECEIVING OPENINGS

Ivan R. Adams, Columbus, Ohio

Application December 23, 1949, Serial No. 134,830

3 Claims. (Cl. 143—133)

This invention relates to shaft-mounted tools, having particular reference to circular saws and similar disk-like bodies adapted to be mounted for rotation on revoluble arbors or shafts.

Such saws are provided with arbor-receiving openings which vary in diameter. As a result, it is necessary, from a practical point of view, for dealers in circular saws, for example, to keep in stock a relatively large number of saws in order to provide the required variety of arbor diameter sizes in meeting trade demands.

Accordingly, it is an object of the present invention to provide a circular saw, or other similar tool body, with an axial arbor-receiving opening formed to present a plurality of relatively separate circularly arranged and radially disposed projections which are formed in sets having different depth or radial dimensions, the projections being so formed and arranged that the same may be removed as desired from the saw or tool body, in order to vary the effective size or diameter of the arbor-receiving openings of such saws or bodies, and to thereby render the same adaptable to be mounted on arbors of varying diameter, thus reducing the necessity for dealers maintaining relatively large stocks of saws or other similar tools as a result of the presence of fixed diameters which can not be varied.

For a further understanding of the invention, reference is to be had to the following description and the accompanying drawing, wherein:

Fig. 1 is a front elevational view of a circular saw having an arbor-receiving axially disposed opening formed in accordance with the present invention;

Fig. 2 is a vertical transverse sectional view taken through the arbor region of the saw on a plane indicated by the line 2—2 of Fig. 1;

Fig. 3 is a fragmentary front elevational view of the central portion of a circular saw in which certain of the arbor-engaging projections have been removed from the saw body to adapt the latter to an arbor diameter different from that disclosed in Fig. 1;

Fig. 4 is a vertical transverse sectional view disclosing the invention as applied to the hub region of a grinding or polishing wheel.

Referring to the drawing, the numeral 1 designates a circular saw, cutting disk, grinding or polishing wheel or other similar body adapted to be mounted on a shaft or arbor. In accordance with the present invention, such a body is provided axially thereof with an arbor-receiving opening 2, this opening being formed by a plurality of radially situated, circularly disposed and inwardly directed arbor-engaging teeth or projections 3. In the specific device illustrated in the drawings, it will be noted that these projections possess different radial depths with respect to the center of the opening 2. At least three of the teeth or projections, indicated at 4, possess the greatest depth. Another set of three projections, indicated at 5, possess an intermediate width or depth, and the remaining set of three projections, indicated at 6, have a depth shorter or less than that of the projections indicated at 4 and 5. All three sets of radial projections are integrally joined with the body 1 of the saw, but where so joined, the projections 4 and 5 are scored on one or both sides of the saw, as at 8. When the projections 4 and 5 are thus subjected to bending forces, or relatively light hammer blows, said projections will be rendered sufficiently frangible along the straight score lines 8 so that the same may be broken or otherwise separated from the body 1, leaving an arbor opening in the saw suitable for the reception of an arbor 9 of given diameter.

If the arbor is of a minimum size, the projections are undisturbed so that the arcuate inner edges of the projections 4, as shown in Fig. 1, will engage with the outer circumferential edges of the arbor 9. If, however, the saw is to be used on an arbor possessing a size greater than that of the arbor indicated at 9, the teeth or projections 4 are preferably removed by bending the projections 4 along the scored or weakened areas, indicated at 8, so that the projections 4 may be removed from the saw body. Such removal, however, is not strictly necessary, since the projections may be bent or deflected to out-of-the-way or inoperative positions. By this expedient, an arbor possessing a diameter greater than that shown in Fig. 1 may be used in connection with the saw, the larger arbor cooperating with the arcuate edges of the projections 5 of intermediate depth.

To adapt the saw for the reception of an arbor of maximum diameter, the projections 4 and 5 are deflected or broken off, as shown in Fig. 3, leaving the projections 6 of minimum depth to receive the arbor. While I have referred specifically to but three sets of teeth or projections, it will be understood that this figure is purely arbitrary and is subject to considerable variation. Likewise, as shown in the drawing, each set of projections is composed of three in number, but this figure is also arbitrary and may be varied as desired, depending upon the nature of the tool, the composition of the material from which it is formed, and other practical factors.

The invention is, of course, subject to various modifications, as, for example, in Fig. 4, the same has been shown as embodied in the hub H of a grinding or polishing wheel W. It will be apparent to those skilled in the art that the present invention may be employed on shaft-carried tools adapted for many specific purposes. The construction shown eliminates the necessity for using adapter devices and other similar means on saw arbors in compensating for variations in arbor diameter, and provides a self-contained, simple and efficient means for enabling a body adapted for rotation about an axis to be properly mounted on axial supports having diameters possessing considerable variance.

I claim:

1. In an article of manufacture, an arbor-engaging hub portion formed with a plurality of sets of radially disposed relatively spaced inward projections, the projections of each of said sets being arranged to define circumferentially spaced segments of a circular arbor-receiving opening of given diameter, and each set of projections defining segments of a circular opening of different diameter from that defined by the other sets, the projections of certain of said sets being removable from said hub portion to permit the latter to accommodate arbors of varying diameter.

2. In an article of manufacture having an arbor-engaging hub portion; a first set of relatively spaced projections formed on said hub portion and projecting radially inwardly in the plane of said article and defining circumferentially spaced side wall segments of an arbor-receiving opening; and at least one other set of projections formed on said hub portion and projecting inwardly in the plane of said article a distance less than said first-named set and defining circumferentially spaced side wall segments of a second arbor-receiving opening of greater diameter than said first-named opening, the projections of said first set being removable from said hub portion to accommodate an arbor having a diameter approximately equal to the diameter of said second opening.

3. A new article of manufacture comprising a body formed with an axial arbor-receiving opening defined by a first set of circumferentially arranged relatively spaced projections integrally formed on said body; a second set of relatively spaced projections formed on said body in the plane of said first set of projections and extending radially inwardly of the opening defined by said first set of projections, said second set of projections being united with said body along bending and breaking-facilitating lines and defining segments of a second arbor-receiving opening of lesser diameter than said first opening, said second set of projections being removable from the plane of said first-named opening to permit the latter to accommodate an arbor having a diameter approximately equal to the diameter of said first-named opening.

IVAN R. ADAMS.

REFERENCES CITED

The following references are of record in the file of this patent:

UNITED STATES PATENTS

| Number | Name | Date |
| --- | --- | --- |
| 1,788,634 | Robinson | Jan. 13, 1931 |
| 2,240,187 | Kingdon | Apr. 29, 1941 |

FOREIGN PATENTS

| Number | Country | Date |
| --- | --- | --- |
| 322,077 | Germany | June 19, 1920 |